US012578905B2

(12) United States Patent
     Muthiah

(10) Patent No.: US 12,578,905 B2
(45) Date of Patent: Mar. 17, 2026

(54) DATA STORAGE DEVICE AND METHOD FOR METADATA RETRIEVAL AND BYPASSING

(71) Applicant: Sandisk Technologies, Inc., Milpitas, CA (US)

(72) Inventor: Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 66 days.

(21) Appl. No.: 18/785,249

(22) Filed: Jul. 26, 2024

(65) Prior Publication Data

US 2026/0029954 A1 Jan. 29, 2026

(51) Int. Cl.
    *G06F 3/06* (2006.01)

(52) U.S. Cl.
    CPC .......... *G06F 3/0659* (2013.01); *G06F 3/0619* (2013.01); *G06F 3/0656* (2013.01); *G06F 3/0679* (2013.01)

(58) Field of Classification Search
    CPC .... G06F 3/0659; G06F 3/0619; G06F 3/0656; G06F 3/0679
    See application file for complete search history.

(56) References Cited

U.S. PATENT DOCUMENTS

| | | | |
|---|---|---|---|
| 11,748,323 B2 | 9/2023 | Larson | |
| 11,941,014 B1 * | 3/2024 | Das | G06F 16/219 |
| 12,222,909 B1 * | 2/2025 | Merling | G06F 16/211 |
| 2008/0065699 A1 | 3/2008 | Bloebaum et al. | |
| 2012/0290558 A1 | 11/2012 | Gruber | |
| 2018/0067933 A1 | 3/2018 | Kaplan et al. | |
| 2018/0276114 A1 * | 9/2018 | Kodama | G06F 3/0619 |
| 2022/0130463 A1 * | 4/2022 | Kim | G11C 16/102 |
| 2022/0167025 A1 * | 5/2022 | Denoual | H04N 21/26258 |
| 2022/0182710 A1 * | 6/2022 | Gupta | H04N 21/4331 |
| 2023/0350581 A1 * | 11/2023 | Ayyapureddi | G06F 3/0622 |
| 2024/0111812 A1 | 4/2024 | Canessa et al. | |
| 2024/0296279 A1 * | 9/2024 | Gardner | G06F 16/338 |

* cited by examiner

*Primary Examiner* — Hiep T Nguyen
(74) *Attorney, Agent, or Firm* — Crowell & Moring LLP

(57) ABSTRACT

A data storage device and method are disclosed for metadata retrieval and bypassing. In one embodiment, a data storage device is provided comprising a memory and one or more processors. The one or more processors, individually or in combination, are configured to: receive, from a host, a request for one, but not both, of data and its associated metadata; and in response to receiving the request: read the data from the memory; extract the metadata from the data; and send one, but not both, of the data and the extracted metadata to the host, per the request received from the host. Other embodiments are provided.

20 Claims, 9 Drawing Sheets

DATA STORAGE DEVICE AND METHOD FOR METADATA RETRIEVAL AND BYPASSING

BACKGROUND

A data storage device can be used to store data for later retrieval by a host. In some situations, the data is associated with metadata, which refers to descriptive information about the data and can provide context, structure, and other relevant details. Metadata can be relevant for understanding, analyzing, and interpreting the data effectively.

DETAILED DESCRIPTION

Figures 1A, 1B, 1C:
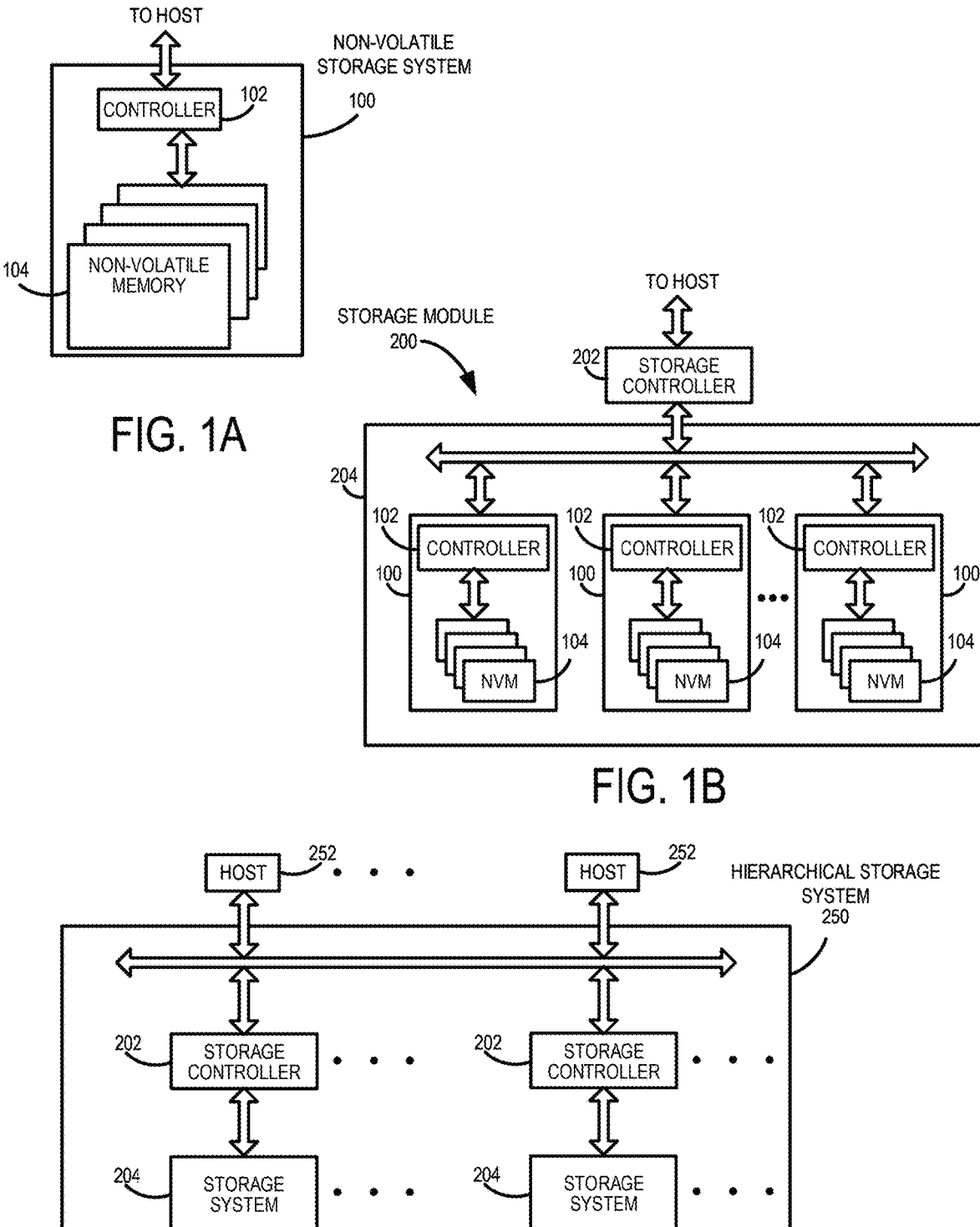
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for metadata retrieval and bypassing. In one embodiment, a data storage device is provided comprising a memory and one or more processors. The one or more processors, individually or in combination, are configured to: receive, from a host, a request for one, but not both, of data and its associated metadata stored in the memory; and in response to receiving the request: read the data and the metadata from the memory; extract the metadata from the data; and send one, but not both, of the data and the extracted metadata to the host, per the request received from the host.

In some embodiments, the one or more processors, individually or in combination, are further configured to store the extracted metadata in a buffer in the data storage device.

In some embodiments, the one or more processors, individually or in combination, are further configured to store the extracted metadata in a region in the memory.

In some embodiments, the region in the memory is transparent to the host.

In some embodiments, the one or more processors, individually or in combination, are further configured to bias an endurance characteristic of the region of the memory.

In some embodiments, the one or more processors, individually or in combination, are further configured to receive, from the host, an identification of a logical range in the memory storing the data and the metadata.

In some embodiments, the one or more processors, individually or in combination, are further configured to receive, from the host, a key-value associated with the data and the metadata.

In some embodiments, the metadata is all of the metadata associated with the data.

In some embodiments, the metadata is some, but not all, of the metadata associated with the data.

In some embodiments, the some, but not all, of the metadata is identified in a data structure.

In some embodiments the metadata is extracted using an extraction algorithm specified by a standard.

In some embodiments, the metadata is extracted using a vendor-specific extraction algorithm.

In some embodiments, the memory comprises a three-dimensional memory.

In another embodiment, a method is provided that is performed in a data storage device comprising a memory. The method comprises: receiving data and its associated metadata for storage in the memory; extracting the metadata from the data; storing the metadata and the data in different block types of the memory; and returning only the metatdata or only the data to a host, per a request from the host.

In some embodiments, the metadata is stored in a compute-specific block of the memory and the data is stored in a non-compute-specific block of the memory.

In some embodiments, the metadata is stored in a block of the memory that has relatively-higher endurance than a block of the memory storing the data.

In some embodiments, the metadata is stored in a block that has relatively-greater error protection than a block of the memory storing the data.

In some embodiments, a block storing the metadata and/or a block storing the data is a device-specific location.

In some embodiments, a block storing the metadata and/or a block storing the data is a host-transparent location.

In another embodiment, a data storage device is provided comprising: a memory configured to store data and associated metadata; means for operating the data storage device in a metadata-off mode in which the data, but not the metadata, is returned to a host; and means for operating the data storage device in a metadata-only mode in which the metadata, but not the data, is returned to a host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
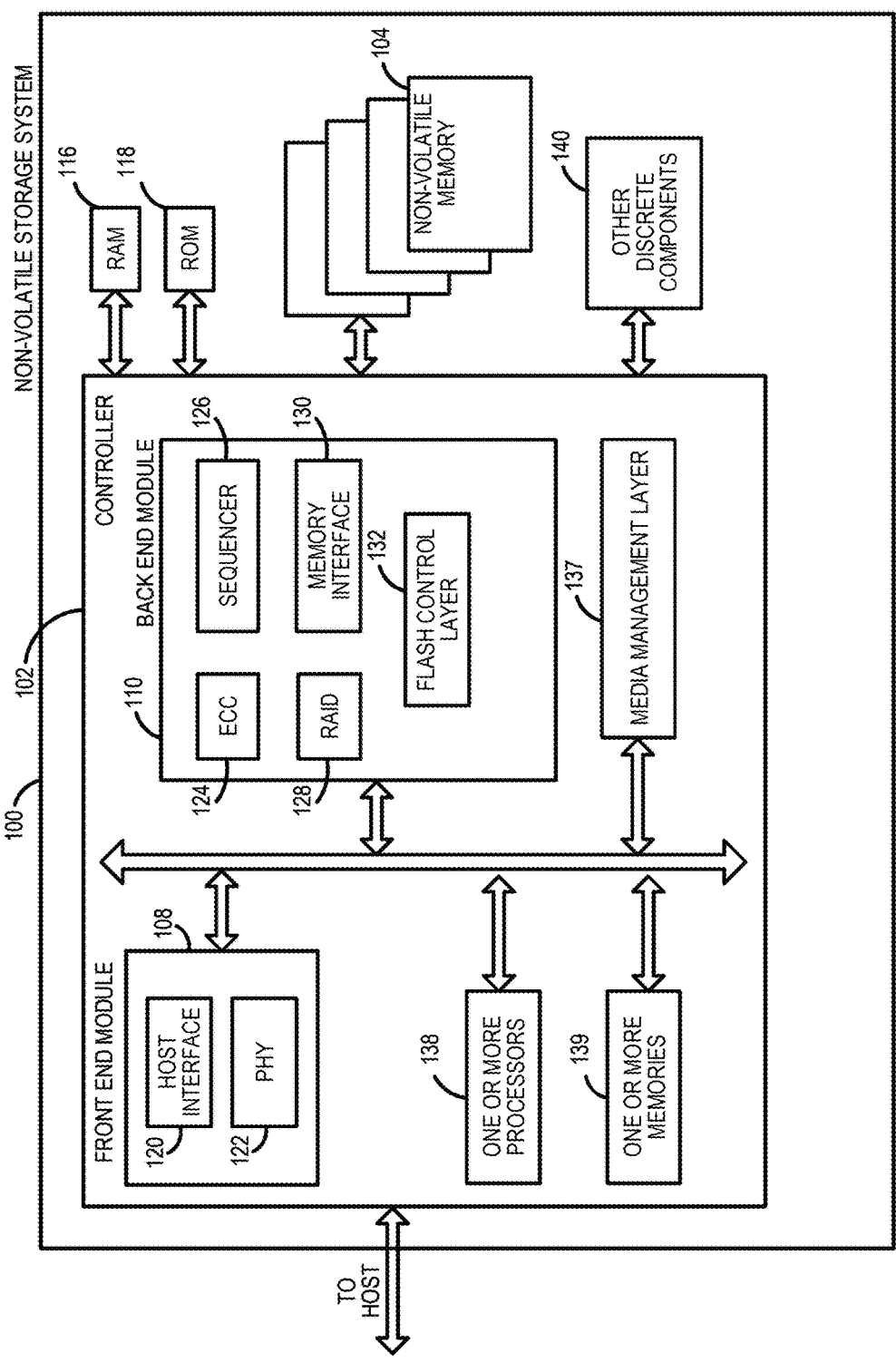
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash)

memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
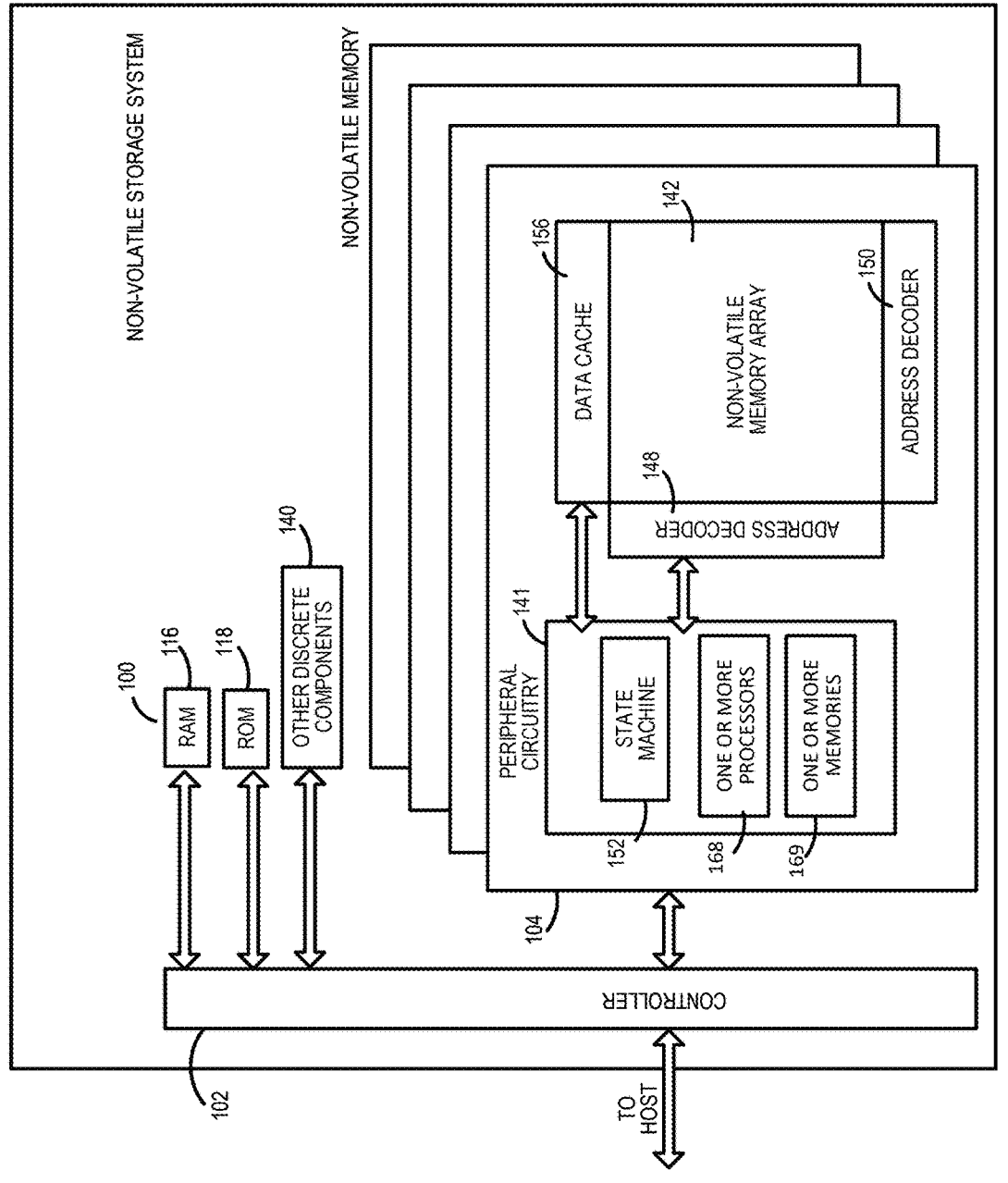
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL)) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
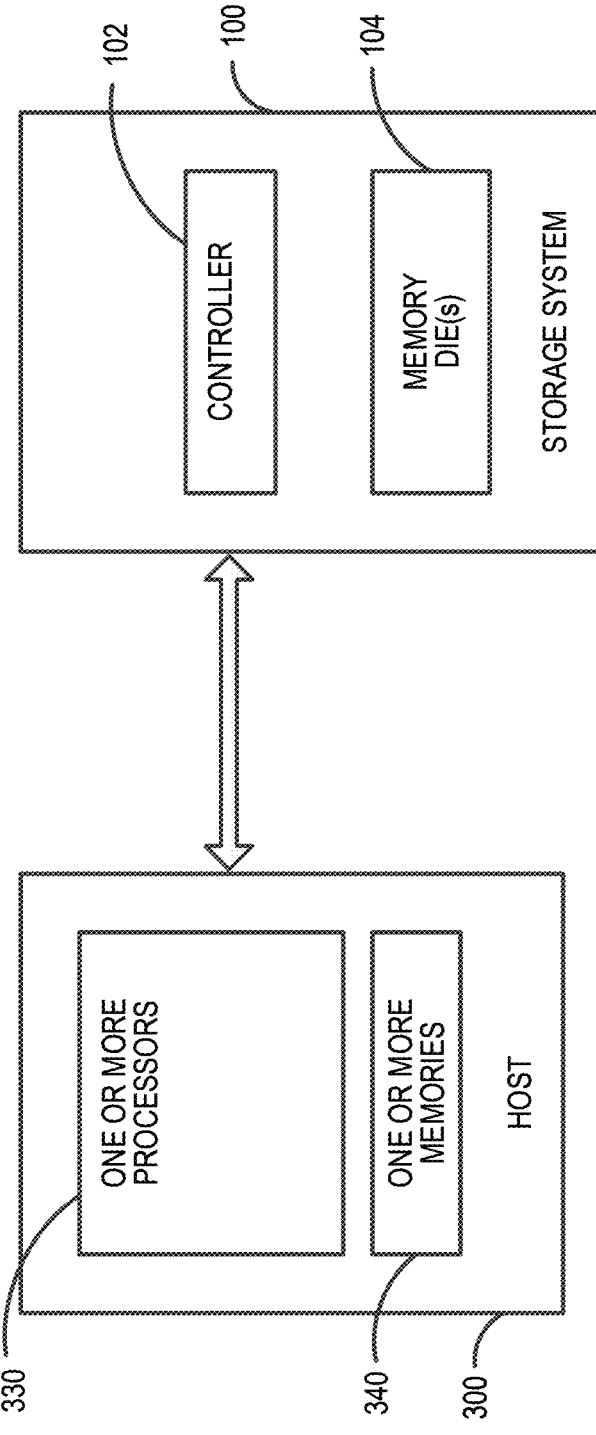
FIG. 3 is a block diagram of a host and a data storage device of an embodiment.
Figure 4:
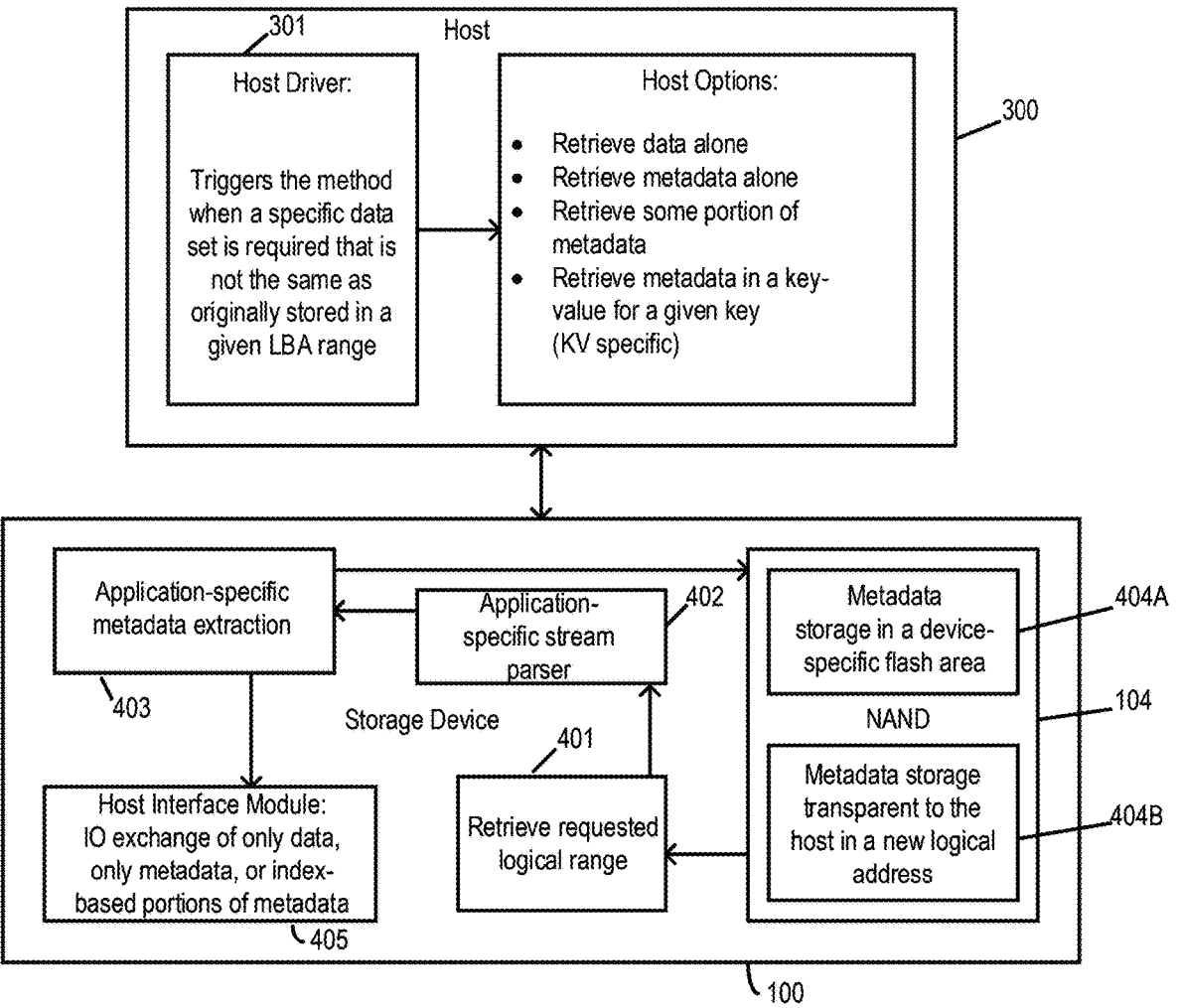
FIG. 4 is a flow diagram of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform, individually or in combination, the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Numerous types of data can have extensive metadata attached to them. Metadata refers to the descriptive information about a particular piece of data, which can provide context, structure, and other relevant details. Without limitation, the following are some examples of data types often associated with extensive metadata.

Scientific Research Data: Datasets generated from scientific experiments, observations, or simulations often come with comprehensive metadata detailing the methodology, equipment used, timestamps, experimental conditions, and more.

Digital Images and Videos: Media files usually contain metadata, known as Exchangeable Image File Format (EXIF) data, which can include information such as camera settings, timestamps, location, and, in some cases, even the device's orientation during capturing.

Genomic Data: DNA sequencing data can come with extensive metadata, such as sample origin, sequencing platform, quality scores, genomic variations, reference sequences used, and annotations.

Healthcare and Medical Records: Patient health records, medical imaging data, or clinical trial datasets can contain metadata, such as patient demographics, medical history, treatment details, diagnostic procedures, and protocols followed.

Each of these data types can carry a wealth of information beyond the core data itself, making metadata relevant for understanding, analyzing, and interpreting the data effectively. Thus, there are scenarios where the metadata—but not the data itself—is desired. On the other hand, there are other scenarios in which the data—but not the metadata—is desired. The following embodiments provide a mechanism to optimize the sharing of desired data (e.g., the data without the metadata, or vice versa).

In one embodiment, the host 300 sends a request to the data storage device 100 for one or more pieces of metadata (or, optionally, actual data minus the one or more pieces of metadata) in a given logical range. In response, the controller 102 of the data storage device 100 is configured to retrieve the range of stored logical data from the memory 104, extract the metadata separately from the stored data, and transfer either the metadata (alone) or the data (alone) associated to the requested range to the host 300 as a part of command execution. Optionally, the controller 102 can send the data, such that it is data minus the one or more pieces of metadata. The metadata parsing and extraction mechanisms applied by the controller 102 can be via a standard specification (e.g., extraction from a Moving Picture Experts Group (MPEG) transport stream (TS) media file, as specified by the open MPEG standard) or a vendor-specific extraction algorithm tuned for a user (e.g., a healthcare application/vendor).

The controller 102 (e.g., using the flash translation layer (FTL)) can perform the parsing extraction algorithms based on the application and the seek request range, as well as manage special-purpose memory blocks to optionally store the extracted metadata in two forms. In one embodiment, the controller 102 can store the extracted metadata in a buffer in the data storage device 100 (such as in an SLC buffer). In another embodiment, the controller 102 can store the data in a logical space that is transparent to the host 300 (e.g., based on end-user application requirements). Based on the retrieval requirement of the data portion of the logical data or the associated metadata, the controller 102 can further bias by choosing destination blocks with appropriate endurance (e.g., SLC/TLC or a different NAND trim) that suits the system needs.

These embodiments can also be used in a key-value (KV) data storage device. In a KV data storage device, the controller retrieves the value from the memory of the requested key, extracts metadata from the data, and shares either the metadata or the data of the key-value as requested by the KV host. In this case, the start and end range is just the beginning and end of the key-value or a set of values associated with a key-group as requested by the KV host.

Figure 5:
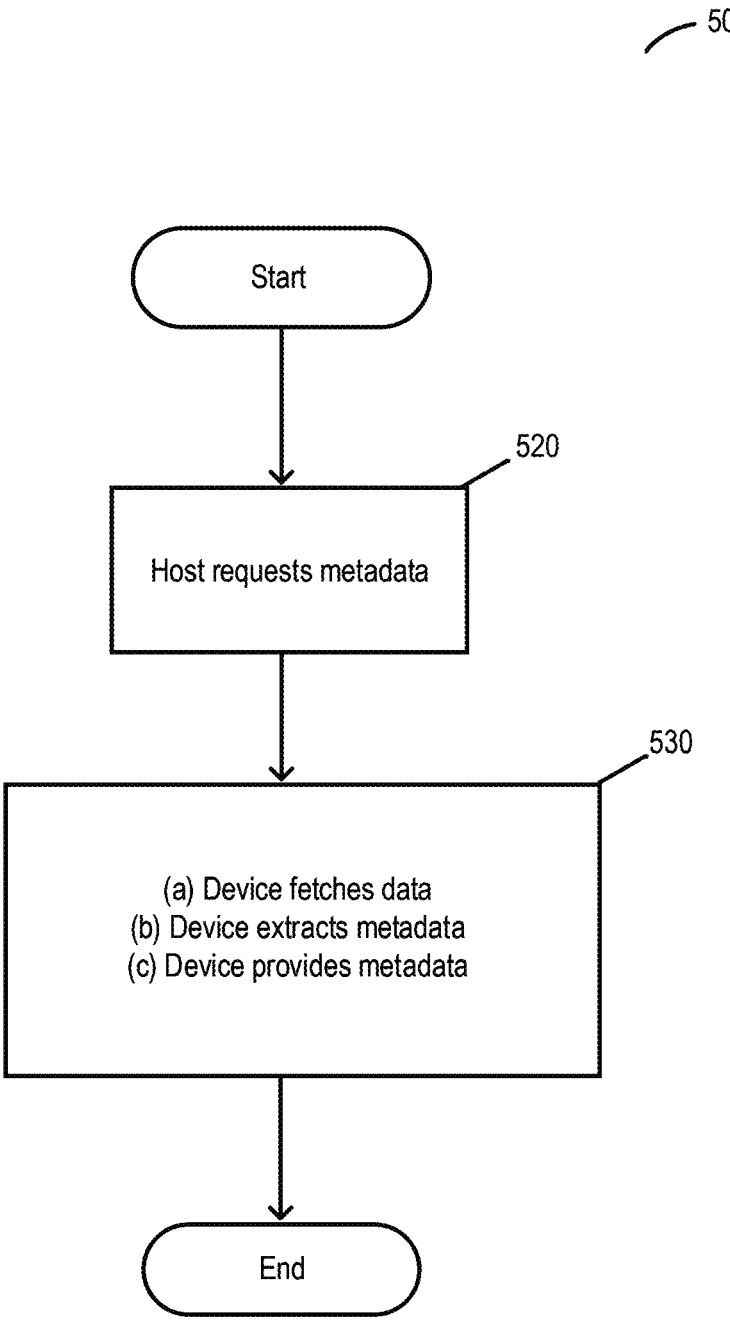
FIG. 5 is a flow chart of a retrieval method of an embodiment for providing a host with metadata but not the associated data.

FIG. 5 is a flow diagram that illustrates these embodiments. As shown in FIG. 5, a host driver in the host 300 triggers the proposed methods when a specific data set is required that is not the same as originally stored in a given LBA range (301). The various host options include: retrieving the data alone, retrieving the metadata alone, retrieving some portion of the metadata, and/or retrieving the metadata in a key-value for a given key. When the data storage device 100 is requested to retrieve a specific logical range (401), an application-specific stream parser (402) in the controller extracts application-specific metadata (403). The memory 104 can store the metadata in a specific portion (404A) of the memory 104 and/or in a new logical address (404B) that is transparent to the host 300. The host interface module can perform an input-output (IO) exchange of only data, only metadata, or index-based portions of the metadata (405).

In one example implementation, the host 300 and the data storage device 100 may have working modes, such as metadata-off and metadata-only modes wherein, on determining that the host 300 has enabled one of these modes, the extracted value or the metadata associated to the requested logical range is provided according to the selected mode of IO operation. Additionally, the controller 102 of the data storage device 100 can be configured to extract the set of all metadata of the data and provide a portion of the metadata to the host 300 (e.g., through indexing of several metadata by the host 300).

The following paragraphs provide several use cases and examples in various domains, which illustrate how these embodiments can provide efficient metadata retrieval, extraction, and management of logical data in the data storage device 100. It should be understood that these are merely examples and that other implementations can be used. In an example involving media streams, a search of a dialogue (audio) in an MPEG video stream may be desired. This typically involves retrieving the stream, decoding the corresponding audio program, and determining an audio match. However, in one embodiment, the host 300 can provide the logical range of the video stream and ask the data storage device 100 for subtitle metadata present in the stream. The controller 102 of the data storage device 100 can extract the set of all subtitles from the MPEG stream with the marked logical range of the command and provide the text to the host 300 in response to the host's request. The amount of IO transfers involved in this embodiment is vastly reduced, as the subtitle size may not even be 1% of the MPEG media stream. The data transfers could be Secure Reliable Transport (SRT) streams as specified under the MPEG transport stream (TS) specification. In some cases, the controller 102 of the data storage device 100 may subsequently perform the text match. In another example involving a search of a dialogue (audio) in an MPEG stream, the controller 102 can be configured to extract the specific audio program from the MPEG stream and provide only the audio program data as a separate stream when the host 300 requests the audio metadata in each logical range.

In another example related to a healthcare system, patient health records, medical imaging data, or clinical trial datasets contain metadata, such as patient demographics, medical history, treatment details, and diagnostic procedures. The controller 102 of the data storage device 100 can be configured to extract a specific metadata stream (such as just the medical history rather than the actual health record associated with a patient) and provide the necessary metadata. To accomplish this, one example implementation uses a set of available metadata and pre-agreed indexing and management of metadata in logical data, as well as a mapping table, to extract one or many pieced of metadata as per application requirements. The table (or other data structure) can be created and managed by the controller 102 of the data storage device 100.

The controller 102 of the data storage device 100 can also provide various flash translation layer (FTL) biasing. For example, the controller 102 can be configured to route data into a block of memory 104 based on whether or not the metadata is associated with the data. For example, the controller 102 can route data that has metadata into compute-specific NAND blocks where data computation is efficient. On the other hand, if the controller 102 determines (or there is a hint) that there is no metadata associated with the data or the key-value, the controller 102 can route the data into non-compute blocks in the memory 104.

Additionally, the controller 102 can extract metadata proactively and store such metadata into specific blocks in the memory 104 apart from storing the host data into host blocks when it determines (or it is hinted) that the host 300 may request such metadata separately. The quality of service (QoS) of the request can be improved if such actions are performed ahead of time.

Further, the controller 102 can use high-endurance memory blocks for storing the metadata if it determines that some of the metadata is retrieved more frequently than a threshold. It may optionally use bias data protection schemes, such as using different error correction code (ECC)/exclusive-or (XOR) logic for different blocks associated with the actual data and the metadata stream.

Turning again to the drawings, FIG. 5 is a flow chart 500 of a retrieval method of an embodiment for providing a host with metadata but not the underlying data. As shown in FIG. 5, after the method starts, the host 300 requests metadata (520), and the controller 102 of the data storage device 100 fetches the data, extracts the metadata, and provides the metadata (530)

Figure 6:
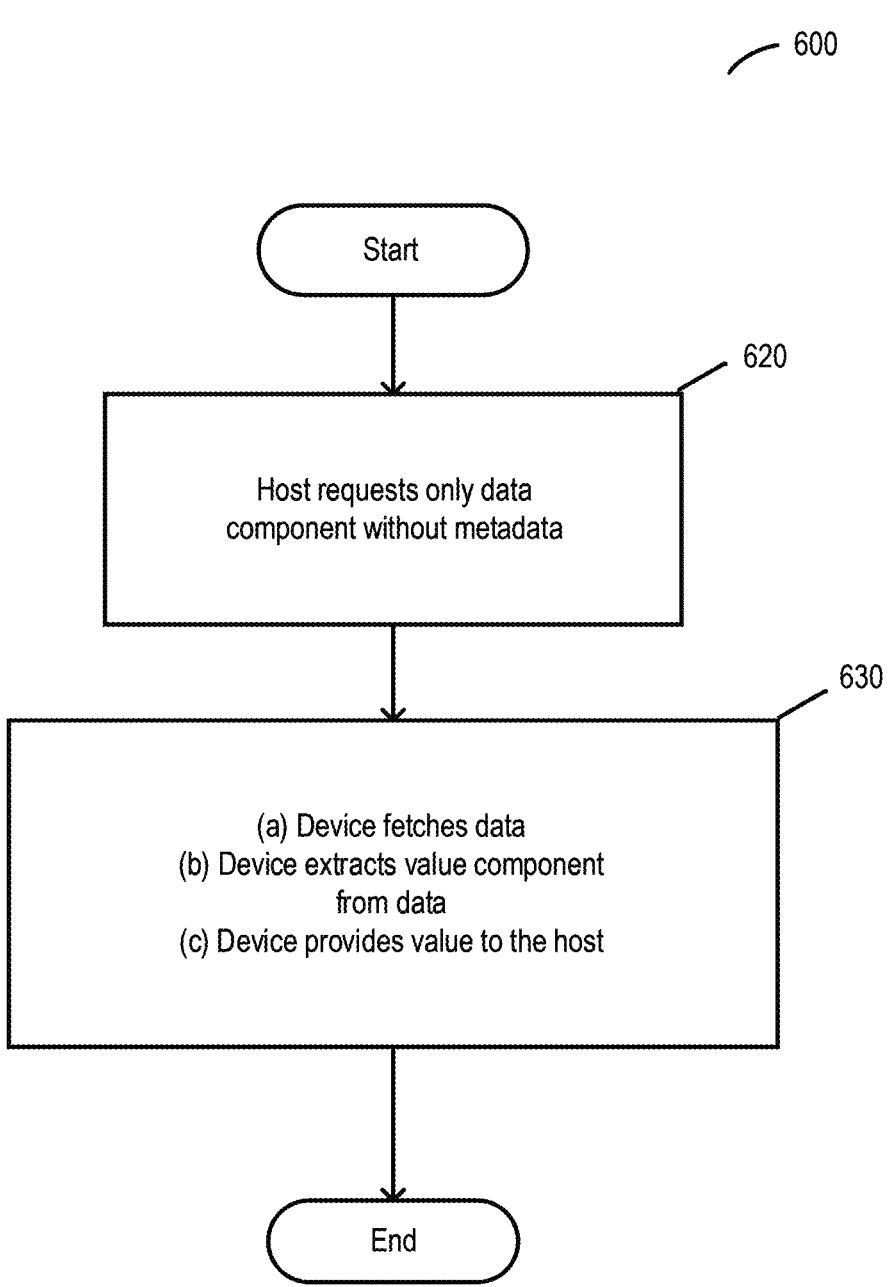
FIG. 6 is a flow chart of a retrieval method of an embodiment for providing a host with data but not the associated metadata.

FIG. 6 is a flow chart 600 of a retrieval method of an embodiment for providing a host with data but not the associated metadata. As shown in FIG. 6, after the method starts, the host 300 requests only the data component without the associated metadata (620). The controller 102 of the data storage device 100 then fetches the data, extracts the value component of the data (i.e., the data itself without the metadata), and provides the value to the host 300 (630).

Figure 7:
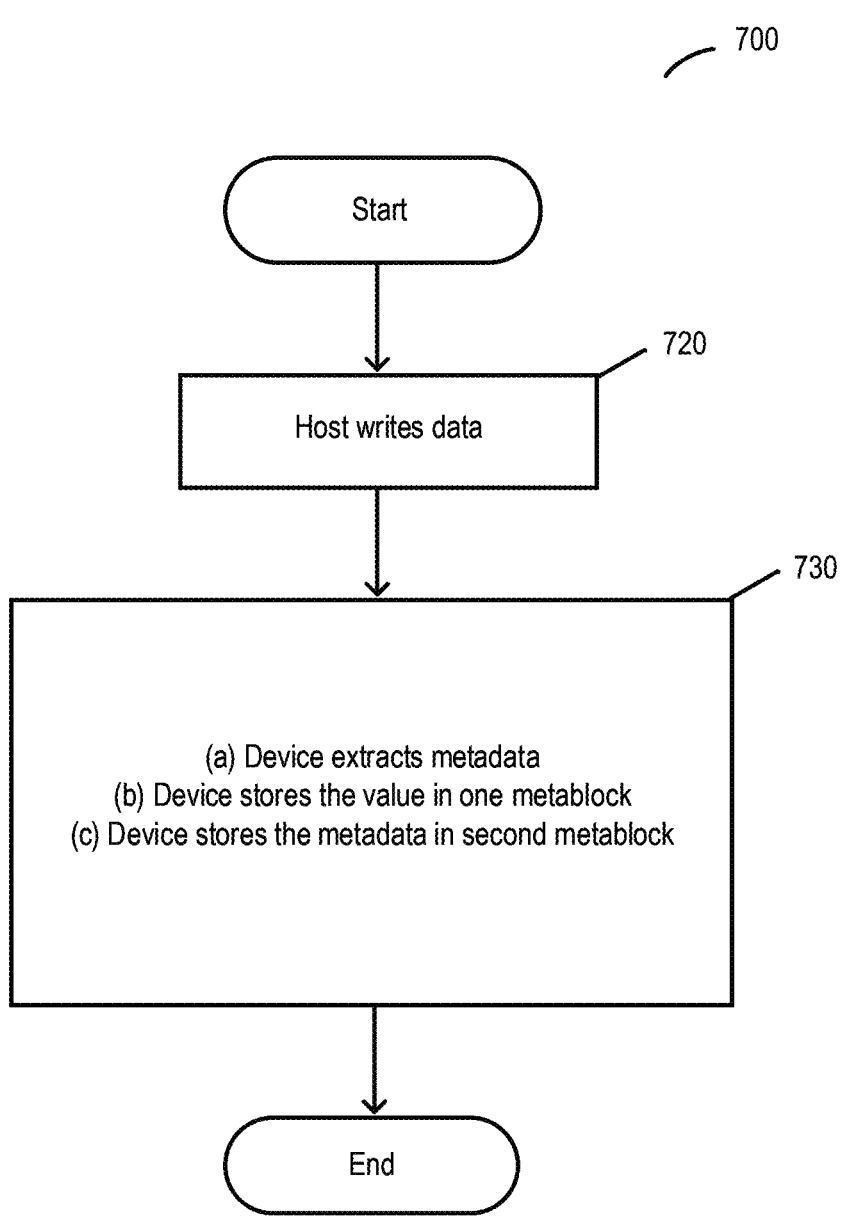
FIG. 7 is a flow chart of a storage method of an embodiment.

FIG. 7 is a flow chart 700 of a storage method of an embodiment. As shown in FIG. 7, after the method starts, the host 300 writes data with associated metadata to the data storage device 100 (720). The controller of the data storage device 100 then extracts the metadata, stores the value (i.e., the data itself) in one block (e.g., in a first metablock) in the memory 104, and then stores the metadata in a different block (e.g., a second metablock) in the memory 104 (730). These blocks can be in a device-specific location or in a host-transparent location.

Figure 8:
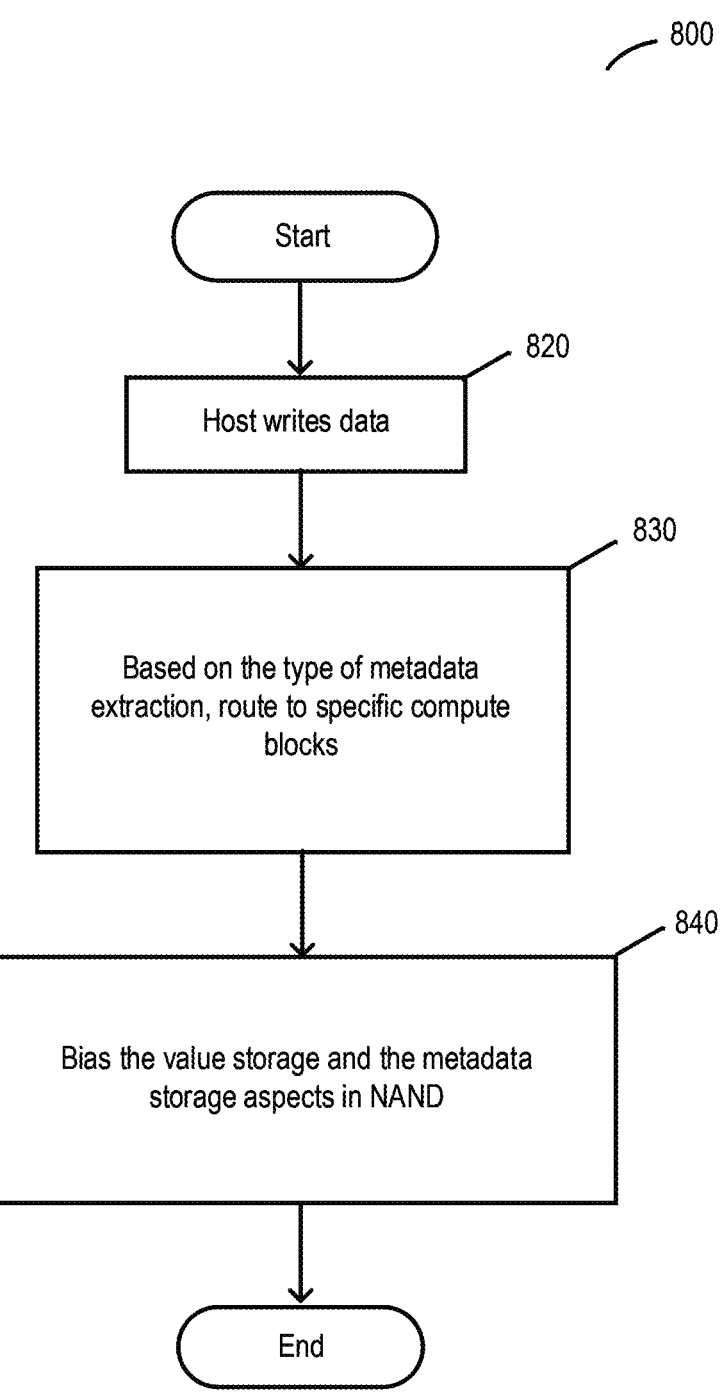
FIG. 8 is a flow chart of a routing and biasing method of an embodiment.

FIG. 8 is a flow chart 800 of a routing and biasing method of an embodiment. As shown in FIG. 8, after the method starts, the host 300 writes data to the data storage device 100 (820). The controller 102 in the data storage device 100 then routes the data to specific compute blocks based on the type of metadata extraction (830). Then, the controller 102 in the data storage device 100 biases the value storage and the metadata storage aspects in the memory 104 (840).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
one or more processors, individually or in combination, configured to:
store data and its associated metadata in the memory, wherein the associated metadata comprises a plurality of pieces of metadata;
receive a request from an application on a host; and
in response to receiving the request:
read the data and its associated metadata from the memory;
use a pre-agreed indexing of the associated metadata to extract a subset of the plurality of pieces of the metadata per a requirement of the application on the host; and
send the extracted subset of the plurality of pieces of the metadata to the host.

2. The data storage device of claim 1, wherein the one or more processors, individually or in combination, are further configured to store the extracted subset of the plurality of pieces of the metadata in a buffer in the data storage device.

3. The data storage device of claim 1, wherein the one or more processors, individually or in combination, are further configured to store the extracted subset of the plurality of pieces of the metadata in a region in the memory.

4. The data storage device of claim 3, wherein the region in the memory is transparent to the host.

5. The data storage device of claim 3, wherein the one or more processors, individually or in combination, are further configured to bias an endurance characteristic of the region of the memory.

6. The data storage device of claim 3, wherein the one or more processors, individually or in combination, are further configured to receive, from the host, a key-value associated with the data and its associated metadata.

7. The data storage device of claim 1, wherein the one or more processors, individually or in combination, are further configured to receive, from the host, an identification of a logical range in the memory storing the data and its associated metadata.

8. The data storage device of claim 1, wherein the associated metadata is all of the metadata associated with the data.

9. The data storage device of claim 1, wherein the associated metadata is some, but not all, of the metadata associated with the data.

10. The data storage device of claim 9, wherein the some, but not all, of the associated metadata is identified in a data structure.

11. The data storage device of claim 1, wherein the subset of the plurality of pieces of the metadata is extracted using an extraction algorithm specified by a standard.

12. The data storage device of claim 1, wherein the subset of the plurality of pieces of the metadata is extracted using a vendor-specific extraction algorithm.

13. The data storage device of claim 1, wherein the memory comprises a three-dimensional memory.

14. A method comprising:

performing in a data storage device comprising a memory:

storing data and its associated metadata in the memory, wherein the associated metadata comprises a plurality of pieces of metadata;

receiving a request from an application on a host; and in response to receiving the request:

reading the data and its associated metadata from the memory;

using a pre-agreed indexing of the associated metadata to extract a subset of the plurality of pieces of the metadata per a requirement of the application on the host; and sending the extracted subset of the plurality of pieces of the metatdata to the host.

15. The method of claim 14, wherein the associated metadata is stored in a compute-specific block of the memory and the data is stored in a non-compute-specific block of the memory.

16. The method of claim 14, wherein the associated metadata is stored in a block of the memory that has relatively-higher endurance than a block of the memory storing the data.

17. The method of claim 14, wherein the associated metadata is stored in a block that has relatively-greater error protection than a block of the memory storing the data.

18. The method of claim 14, wherein a block storing the associated metadata and/or a block storing the data is a device-specific location.

19. The method of claim 14, wherein a block storing the associated metadata and/or a block storing the data is a host-transparent location.

20. A data storage device comprising:

a memory; and means for:

storing data and its associated metadata in the memory, wherein the associated metadata comprises a plurality of pieces of metadata;

receiving a request from an application on a host; and in response to receiving the request:

reading the data and its associated metadata from the memory:

using a pre-agreed indexing of the associated metadata to extract a subset of the plurality of pieces of the metadata per a requirement of the application on the host; and sending the extracted subset of the plurality of pieces of the metadata to the host.

* * * * *